United States Patent
Ohshima et al.

(10) Patent No.: US 10,279,504 B2
(45) Date of Patent: May 7, 2019

(54) MANUFACTURE METHOD AND MANUFACTURING DEVICE FOR MANUFACTURING MAGNET PIECE CONSTITUTING MAGNET BODY FOR FIELD POLE DISPOSED ON ROTATING ELECTRIC MACHINE

(71) Applicant: NISSAN MOTOR CO., LTD., Yokohama-shi, Kanagawa (JP)

(72) Inventors: Takumi Ohshima, Kanagawa (JP); Kiyoshi Hasegawa, Kanagawa (JP); Kimio Nishimura, Kanagawa (JP); Takashi Sekikawa, Kanagawa (JP); Yasushi Matsushita, Kanagawa (JP); Akihisa Hori, Kanagawa (JP); Michito Kishi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 211 days.

(21) Appl. No.: 15/027,470

(22) PCT Filed: Jul. 29, 2014

(86) PCT No.: PCT/JP2014/069970
§ 371 (c)(1),
(2) Date: Apr. 6, 2016

(87) PCT Pub. No.: WO2015/052976
PCT Pub. Date: Apr. 16, 2015

(65) Prior Publication Data
US 2016/0243719 A1    Aug. 25, 2016

(30) Foreign Application Priority Data
Oct. 9, 2013 (JP) .................... 2013-211769

(51) Int. Cl.
*B23P 19/00* (2006.01)
*H02K 15/00* (2006.01)
(Continued)

(52) U.S. Cl.
CPC ............ *B26F 3/002* (2013.01); *H01F 41/026* (2013.01); *H01F 41/0253* (2013.01); *H02K 15/03* (2013.01)

(58) Field of Classification Search
CPC ...... B23D 31/002; B23D 33/08; H02K 15/03; H01F 41/0253; H01F 41/026; B26F 3/002
See application file for complete search history.

(56) References Cited

U.S. PATENT DOCUMENTS

| | | |
|---|---|---|
| 8,497,613 B2 | 7/2013 | Nakamura et al. |
| 8,510,933 B2 | 8/2013 | Murakami et al. |

(Continued)

FOREIGN PATENT DOCUMENTS

| | | |
|---|---|---|
| CN | 102171908 A | 8/2011 |
| JP | 2009-142081 A | 6/2009 |

(Continued)

*Primary Examiner* — Paul D Kim
(74) *Attorney, Agent, or Firm* — Foley & Lardner LLP

(57) ABSTRACT

A manufacture method that includes positioning the permanent magnet body of which a surface is coated with a coating film for deterioration prevention, a scheduled cleavage portion of the permanent magnet body being located between two fulcrums, which are edge portions of a die, supporting the permanent magnet body, and cleaving the permanent magnet body into a cleaved magnet body and the magnet piece by pressing the scheduled cleavage portion of the permanent magnet body is provided. The manufacture method also includes cutting the coating-film between the cleaved magnet body and the magnet piece by pressing an end portion of the cleaved magnet piece from a pressing side (Continued)

of the scheduled cleavage portion, the end portion being on a side opposite to a cleavage surface side.

7 Claims, 17 Drawing Sheets

(51) Int. Cl.
*B26F 3/00* (2006.01)
*H02K 15/03* (2006.01)
*H01F 41/02* (2006.01)

(56) References Cited

U.S. PATENT DOCUMENTS

| | | | | |
|---|---|---|---|---|
| 8,695,210 B2* | 4/2014 | Miyata | ............... | H01F 41/0266 29/607 |
| 8,747,583 B2* | 6/2014 | Takaichi | ............. | H01F 41/0253 156/580 |
| 8,819,921 B2* | 9/2014 | Adachi | ................ | H01F 7/0221 29/417 |
| 9,214,846 B2* | 12/2015 | Fubuki | ................... | H01F 7/021 |
| 9,251,951 B2* | 2/2016 | Takaichi | ................ | H02K 15/03 |
| 9,613,749 B2* | 4/2017 | Matsushita | ............ | H02K 15/03 |
| 2010/0244608 A1 | 9/2010 | Nakamura et al. | | |
| 2012/0036696 A1 | 2/2012 | Murakami et al. | | |
| 2014/0144337 A1 | 5/2014 | Koike et al. | | |
| 2014/0231483 A1 | 8/2014 | Takaichi et al. | | |
| 2015/0000114 A1* | 1/2015 | Matsushita | ......... | H01F 41/0266 29/607 |
| 2015/0158197 A1 | 6/2015 | Takaichi et al. | | |
| 2016/0211073 A1 | 7/2016 | Ohshima et al. | | |

FOREIGN PATENT DOCUMENTS

| | | |
|---|---|---|
| JP | 2013-172554 A | 9/2013 |
| WO | WO-2010/038748 A1 | 4/2010 |
| WO | WO-2013/015047 A1 | 1/2013 |
| WO | WO 2013/047298 A1 | 4/2013 |
| WO | WO-2013/108772 A1 | 7/2013 |
| WO | WO-2013/125513 A1 | 8/2013 |
| WO | WO-2013/129248 A1 | 9/2013 |
| WO | WO 2014/007038 A1 | 1/2014 |
| WO | WO-2015/029882 A1 | 3/2015 |

* cited by examiner

MANUFACTURE METHOD AND MANUFACTURING DEVICE FOR MANUFACTURING MAGNET PIECE CONSTITUTING MAGNET BODY FOR FIELD POLE DISPOSED ON ROTATING ELECTRIC MACHINE

TECHNICAL FIELD

The present invention relates to a manufacture method and a manufacturing device for manufacturing a magnet piece constituting a magnet body for a field pole disposed on a rotating electric machine.

BACKGROUND ART

Conventionally, as a magnet body for a field pole disposed on a rotating electric machine, a magnet body for a field pole formed by providing a plurality of magnet pieces by cleaving a plate-shaped magnet body (hereinafter referred to simply as a "magnet body") and by bonding a plurality of the magnet pieces to each other is known. Since such magnet body for a field pole is formed of a plurality of the magnet pieces, a volume of each magnet piece can be made small, and an eddy current generated in the magnet piece by fluctuation of a magnetic field by rotation of a rotor can be reduced. As a result, heat generation of the magnet body for a field pole caused by generation of the eddy current can be suppressed, and irreversible heat demagnetization can be prevented (see Patent Literature 1).

JP2009-142081A discloses manufacture of a plurality of magnet pieces by placing a magnet body having a notch provided along a scheduled cleavage line on a die supporting a magnet body on both end portions in a direction perpendicular to the scheduled cleavage line and by pressing an upper part of the scheduled cleavage line downward by a blade so as to cleave the magnet body along the scheduled cleavage line.

The magnet body is fed on the die in a longitudinal direction and cleaved by the blade one by one sequentially from a tip end portion in a feeding direction. The magnet body is cleaved by pressing the blade downward from the upper part of the scheduled cleavage line in a state in which the both sides of the scheduled cleavage line are supported by the die. That is, the magnet body is cleaved by three-point bending.

SUMMARY OF INVENTION

The magnet body has a nature that it is apt to rust, and the surface of the magnet body is coated with a material having an anti-rusting effect. Since the material of this coating film is a ductile material, the coating film is not rolled to a state capable of being cut in a portion of the scheduled cleavage line during cleavage of the magnet body, and the coating film is not cut in some cases. If the coating film is not cut, a cleaved magnet piece and a magnet piece which has not been cut are connected by the uncut coating film. As a result, when the cleaved magnet pieces are conveyed to a subsequent process, nonconformity that the magnet body that has not been cut is also conveyed at the same time occurs incidentally.

The present invention was made in view of the aforementioned problem and has an object to provide a manufacture method and a manufacturing device suitable for manufacture of a magnet piece constituting a magnet body for a field pole disposed on a rotating electric machine by cleaving the magnet body provided with a coating film.

According to one aspect of the present invention, the present invention provides a manufacture method. The manufacture method of manufacturing a magnet piece constituting a magnet body for a field pole disposed on a rotating machine by cleaving a permanent magnet body. The manufacture method includes positioning the permanent magnet body of which a surface is coated with a coating film for deterioration prevention, a scheduled cleavage portion of the permanent magnet being located between two fulcrums supporting the permanent magnet body, cleaving the permanent magnet body into a cleaved magnet body and the magnet piece by pressing the scheduled cleavage portion of the permanent magnet body, and cutting the coating-film between the cleaved magnet body and the magnet piece by pressing an end portion of the cleaved magnet piece from a direction in which the scheduled cleavage portion is pressed, the end portion being on a side opposite to a cleavage surface side.

DESCRIPTION OF EMBODIMENTS

Embodiments of the present invention will be described below by referring to the attached drawings.

First Embodiment

Figure 1A:
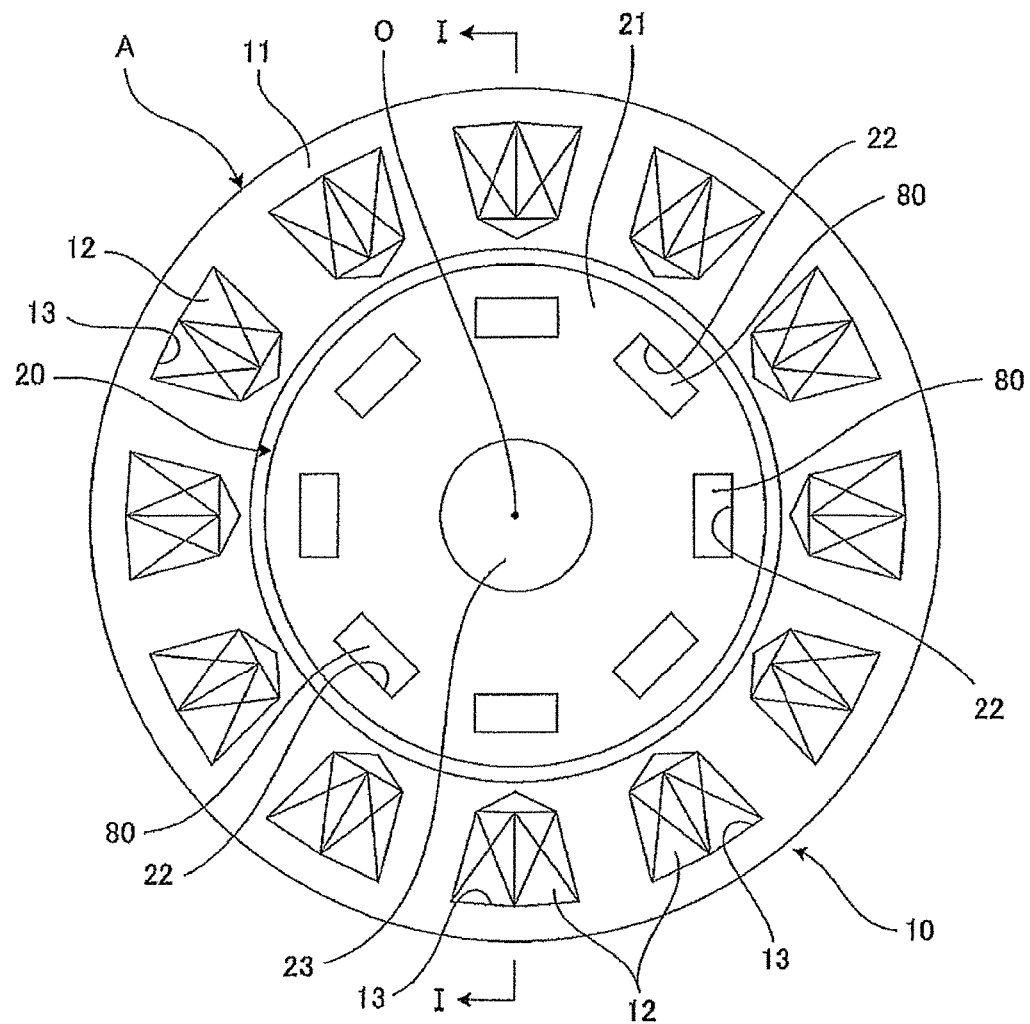
FIG. 1A is a schematic configuration view illustrating configuration of major portions of a permanent-magnet rotating electric machine to which a magnet body for a field pole constituted by a magnet piece manufactured by a manufacture method and a manufacturing device in this embodiment is applied.
Figure 1B:
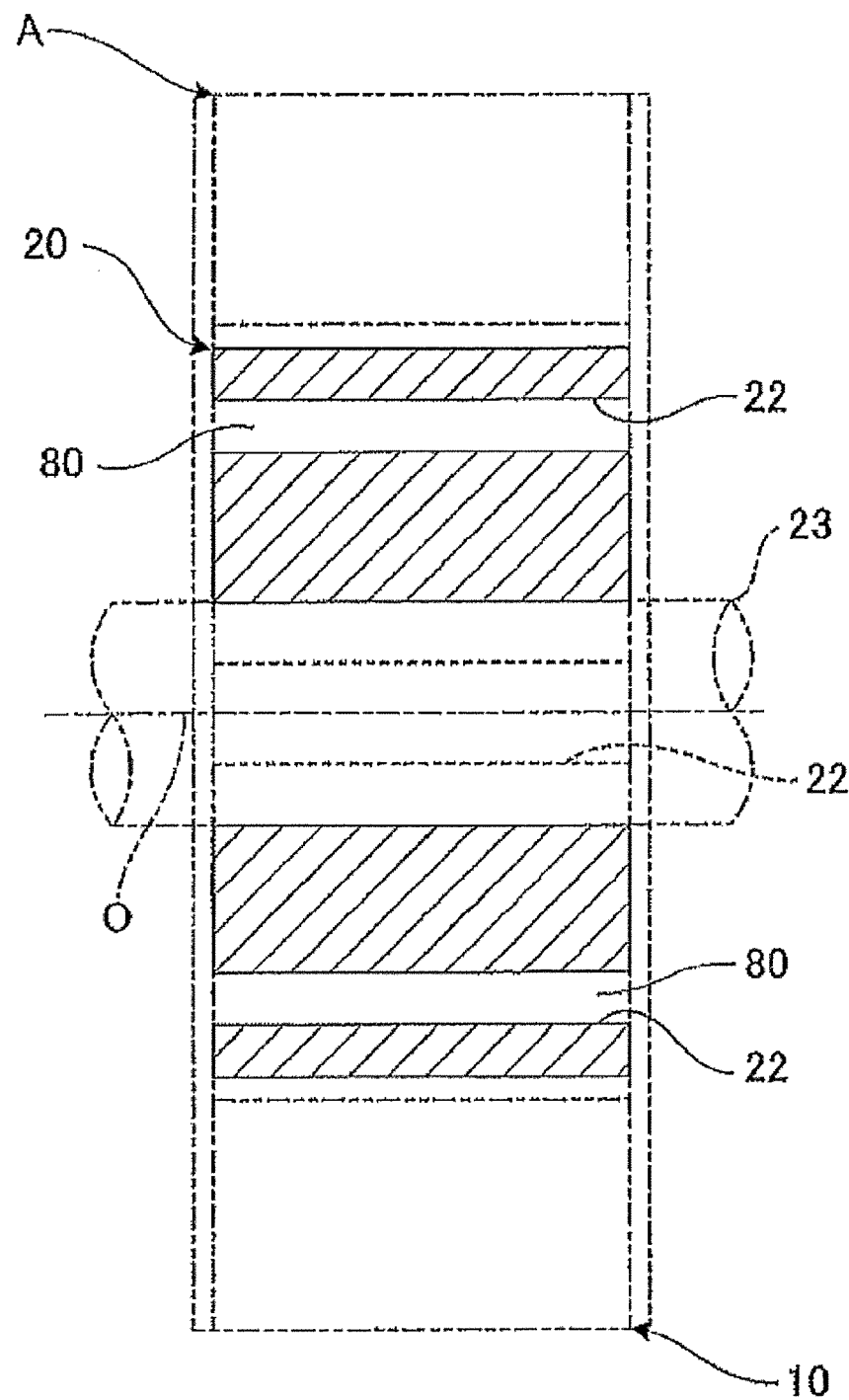
FIG. 1B is a sectional view illustrating an I-I section of the permanent-magnet rotating electric machine in FIG. 1A.

FIG. 1A and FIG. 1B illustrating an I-I section of FIG. 1A illustrate a permanent magnet embedded rotating electric machine A (hereinafter referred to simply as a "rotating electric machine A") to which a magnet body 80 for a field pole constituted of a magnet piece manufactured by the manufacture method and the manufacturing device in this embodiment is applied.

The rotating electric machine A includes a ring-shaped stator 10 constituting a part of a casing and a columnar-shaped rotor 20 arranged coaxially with this stator 10.

The stator 10 includes a stator core 11 and a plurality of coils 12. A plurality of coils 12 are accommodated in slots 13 formed in the stator core 11 at an equal angle interval on the same circumference around an axis center O.

The rotor 20 is constituted by a rotor core 21, a rotating shaft 23 rotating integrally with the rotor core 21, and a plurality of magnet bodies 80 for a field pole, and a plurality of magnet bodies 80 for a field pole are accommodated in slots 22 formed at an equal angle interval on the same circumference around the axis center O.

Figure 2:
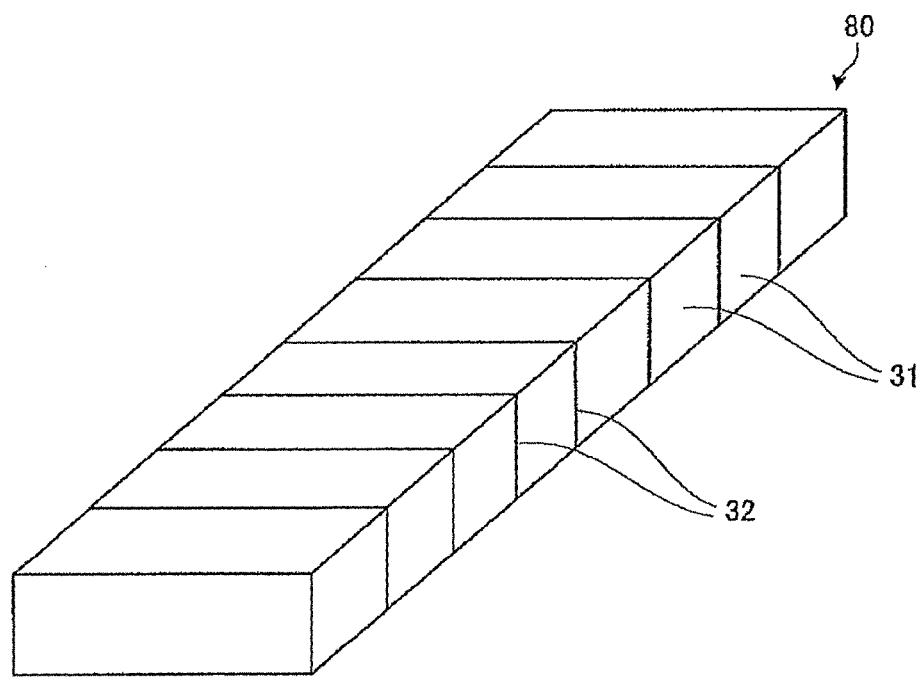
FIG. 2 is a configuration view illustrating configuration of the magnet body for a field pole.

The magnet body 80 for a field pole accommodated in the slot 22 of the rotor 20 is, as illustrated in FIG. 2, constituted by an assembly of magnet pieces 31 in which a plurality of magnet pieces 31 are aligned in a row. The magnet piece 31 is obtained by division through cleaving of a plate-shaped magnet body 30 covered on the entire circumferential surface with a coating film provided with an anti-rusting effect and having rectangular upper and lower surfaces along a short side direction of the rectangle. The magnet body 80 for a field pole is constituted by bonding cleaved surfaces of a plurality of divided magnet pieces 31 to each other by a resin 32. As the used resin 32, such a resin provided with heat-resistant performances of approximately 200° C., for example, is used, and the adjacent magnet pieces 31 are electrically insulated from each other. As a result, an eddy current generated in the magnet piece 31 by fluctuation of an acting magnetic field is reduced by retaining it in the individual magnet pieces 31 so as to suppress heat generation of the magnet body 80 for a field pole caused by the eddy current, and irreversible heat demagnetization can be prevented.

Figure 3A:
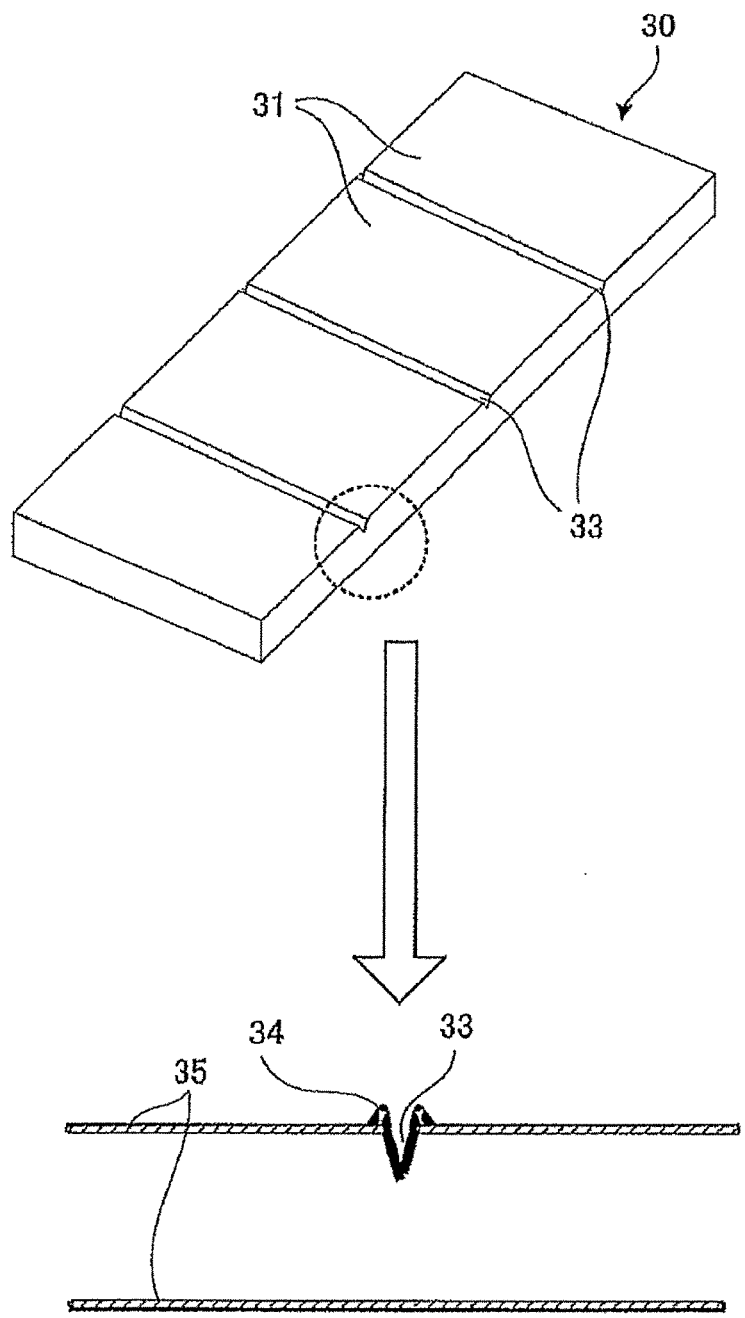
FIG. 3A is a view for illustrating a grooving process of the magnet body.

Subsequently, by referring to FIGS. 3A to 3C, a process of manufacturing a plurality of the magnet pieces 31 from the plate-shaped magnet body 30 covered on the entire circumferential surface with the coating film 35 provided with the anti-rusting effect will be described.

In order to cleave the magnet body 30 into a plurality of magnet pieces 31, it is effective to form a fragile portion made of a notched groove 33 or the like in advance in a portion (scheduled cleavage line) to be cleaved of the magnet body 30 as illustrated in FIG. 3 A. The deeper a depth of the notched groove 33 provided as a fragile portion from the surface is, or the sharper an angle of a bottom portion of the notched groove 33 is, the more flatness of a cleavage surface 36 obtained by being cleaved as the magnet piece 31 is improved.

As a method for forming the notched groove 33, there are a method of providing it in a molding process of the magnet body 30 by a rib for forming a groove provided in a molding die of the magnet body 30, a method using mechanical machining such as a dicer or a slicer, a method by using laser-beam irradiation, wire-cut discharge machining and the like. When the notched groove 33 is formed by mechanical machining, the laser-beam irradiation and the wire-cut discharge machining, the coating film 35 on the surface of the magnet body 30 is also formed by notching at the same time.

Figure 3B:
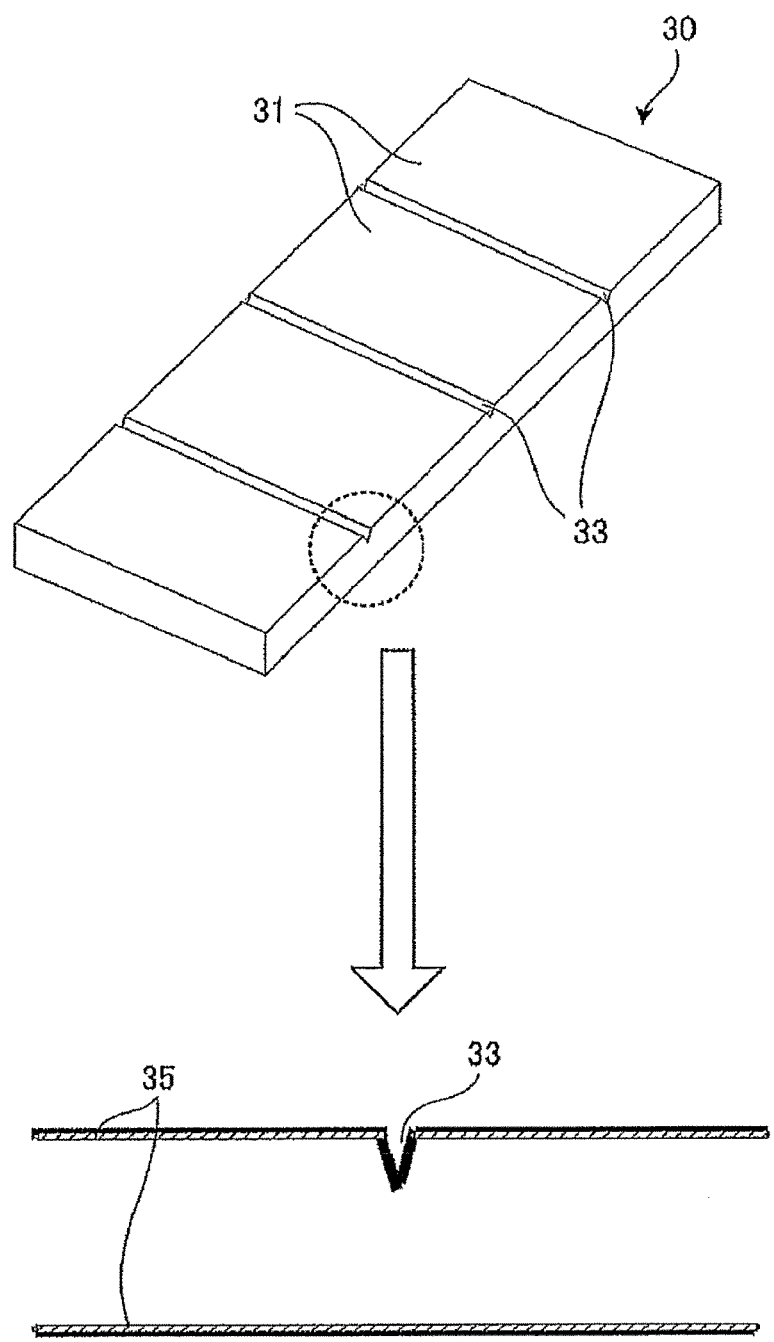
FIG. 3B is a view for illustrating a deburring process of the magnet body.

When the notched groove 33 is formed by the laser-beam irradiation or the wire-cut discharge machining, since a burr 34 is generated along the notched groove 33, this burr 34 is removed by a deburring process as illustrated in FIG. 3B.

Figure 3C:
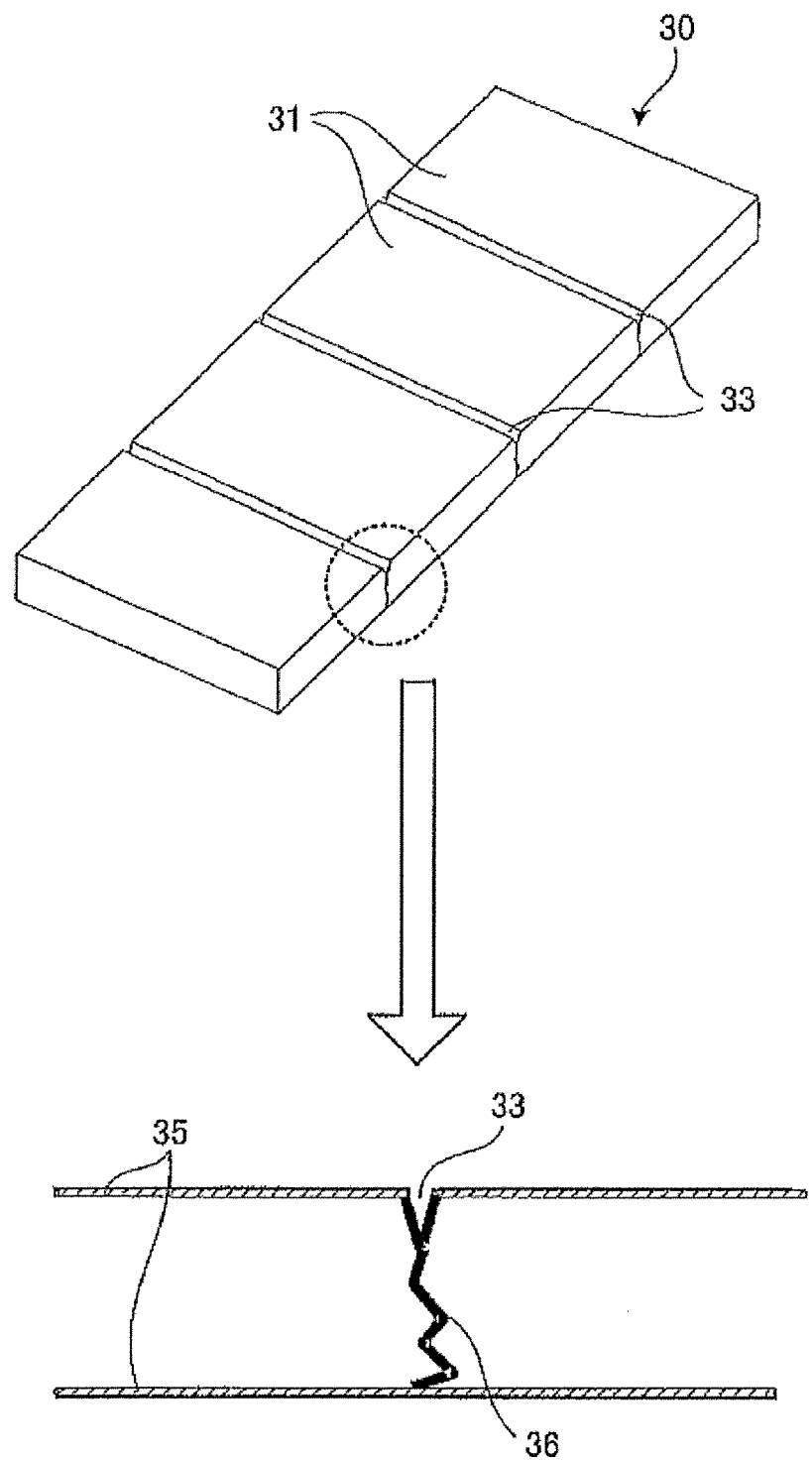
FIG. 3C is a view for illustrating a cleaving process of the magnet body.

Subsequently, in a cleaving process, by pressing a position corresponding to the groove 33 by a blade which will be described later from a side without the notched groove 33 in a state with the notched groove 33 directed downward, as illustrated in FIG. 3C, the magnet body 30 is cleaved along the notched groove 33 into a plurality of magnet pieces 31.

Figure 4A:
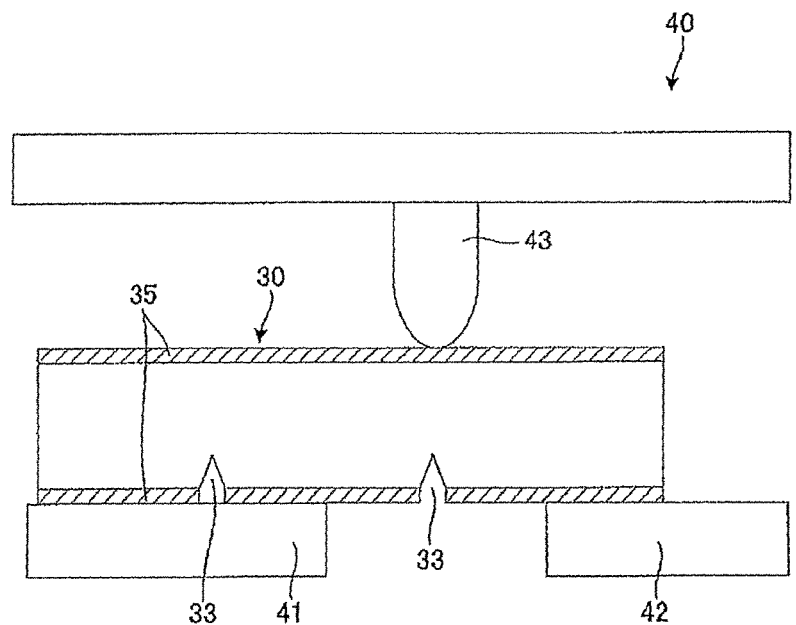
FIG. 4A is a view illustrating the cleaving process of a manufacturing device in a comparative example 1.
Figure 4B:
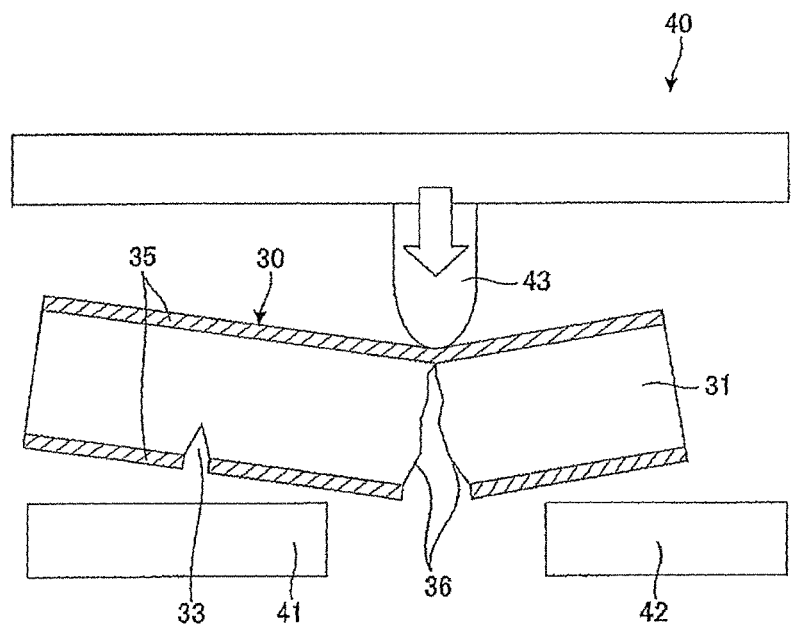
FIG. 4B is a view illustrating the cleaving process of the manufacturing device in the comparative example 1.

FIGS. 4A and 4B illustrate an outline of a manufacturing device 40 in a comparative example 1 for performing the cleaving process illustrated in FIG. 3C.

The manufacturing device 40 is a device for cleaving the magnet body 30 by three-point bending by placing the magnet body 30 in a state extended between a pair of dies 41 and 42 and by lowering the blade 43 from an upper part to the extended portion. The manufacturing device 40 includes the pair of dies 41 and 42 as a lower die on which the magnet body 30 is placed by being extended, the blade 43 for cleaving the magnet body 30 by pressing the extended portion of the magnet body 30, and a magnet conveying device, not shown, for sequentially conveying the magnet bodies 30 from one end portion to immediately below the blade 43 (FIG. 4A).

The blade 43 cleaves the magnet body 30 by pressing an upper surface of the magnet body 30 extended between the pair of dies 41 and 42 downward. The blade 43 is positioned so as to have a tip end located in the middle between the pair of dies 41 and 42 and is driven by a servo press, a machine press, a hydraulic press or the like, for example.

The manufacturing device 40 is constituted as above, and the magnet body 30 with the notched groove 33 provided is placed by being extended on the upper surfaces of the pair of dies 41 and 42. The magnet body 30 is placed on the pair of dies 41 and 42 at a position desired to be cleaved, that is, so that the notched groove 33 provided on the scheduled cleavage line in advance is located on a side faced with the dies 41 and 42 sides.

Then, by the magnet conveying device, not shown, in a state in which the notched groove 33 as the scheduled cleavage line is aligned so as to be located in the middle between the pair of dies 41 and 42, the blade 43 is lowered. When the blade 43 is lowered, the blade 43 presses the back side of the notched groove 33 downward, and the magnet body 30 is cleaved along the notched groove 33 by the three-point bending of the blade 43 and mutually adjacent edge portions 41a and 42a of the pair of dies 41 and 42 (FIG. 4B).

At this time, the coating film 35 covering the surface of the magnet body 30 is cut on a side surface side of the magnet body 30 as the cleavage surface 36 generated by the notched groove 33 progresses, but a state in which the upper surface side of the magnet body 30 in contact with the blade 43 is not cut is generated. That is, the cleaved magnet piece 31 and the magnet body 30 that has not been cleaved are in a state connected by the coating film 35 on the upper surface side that has not been cut.

As a reason why the cleaved magnet piece 31 and the magnet body 30 that has not been cut are in the state connected by the coating film 35 as above, formation of the coating film 35 by a ductile material can be cited, first. Moreover, in the manufacturing device 40 in the comparative example 1, during cleavage of the magnet body 30, the blade 43 is in contact with the coating film 35 on the upper surface side of the magnet body 30 on the portion of the scheduled cleavage line so as to press down this coating film 35 so as to bend it to the lower side, but a tensile force to such a degree to result in cutting of the coating film 35 cannot be obtained by this pressing down.

Figure 5A:
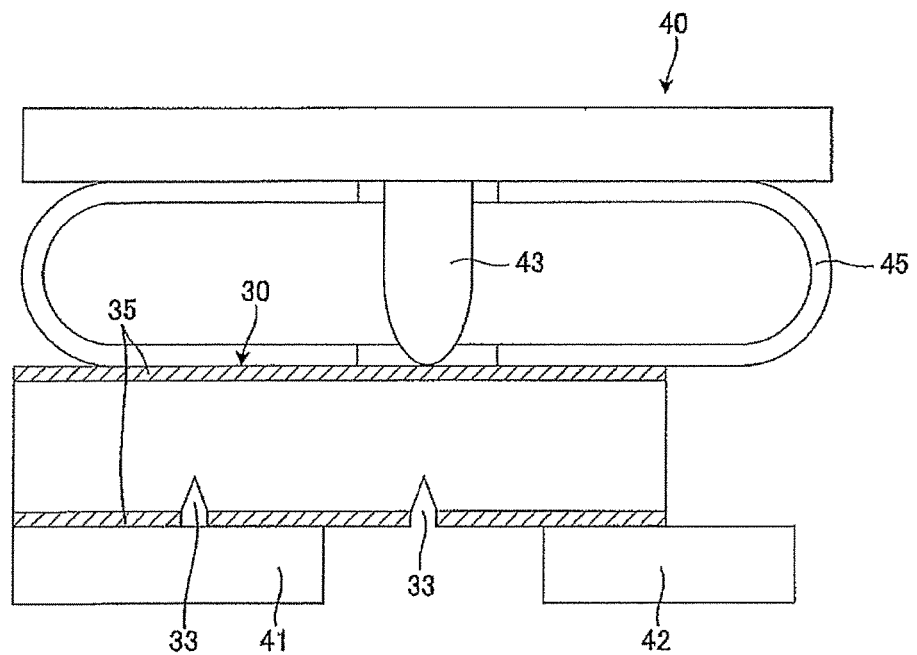
FIG. 5A is a view illustrating the cleaving process of a manufacturing device in a comparative example 2.
Figure 5B:
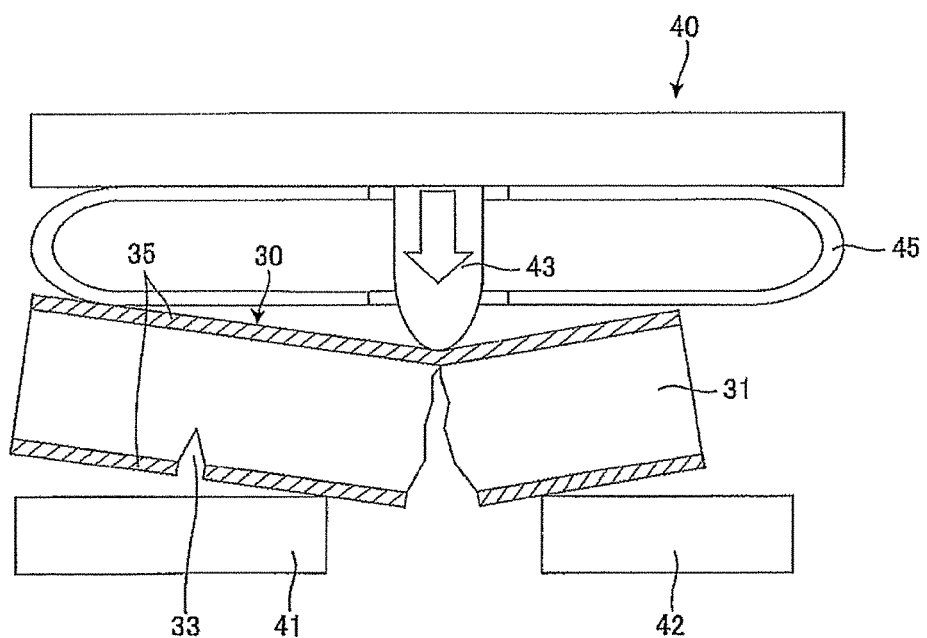
FIG. 5B is a view illustrating the cleaving process of the manufacturing device in the comparative example 2.
Figure 5C:
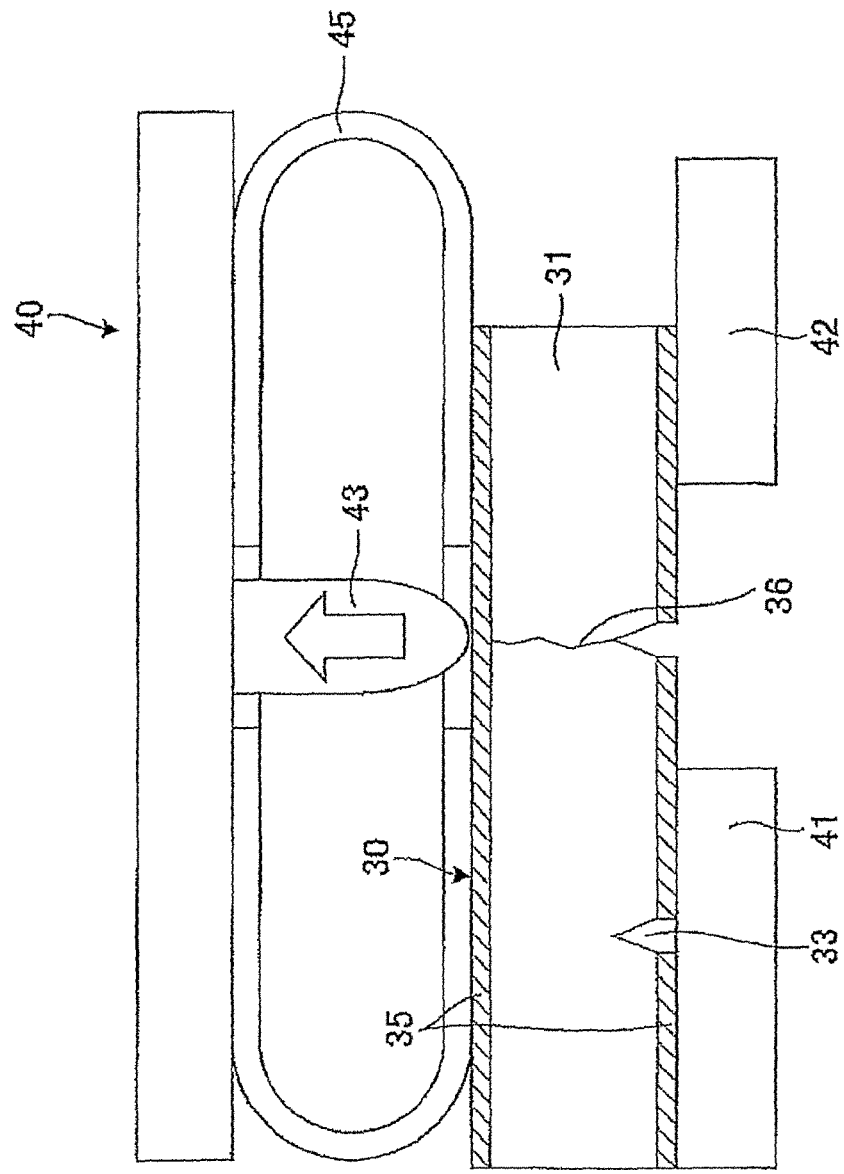
FIG. 5C is a view illustrating the cleaving process of the manufacturing device in the comparative example 2.

The aforementioned problem is made more remarkable in the manufacturing device 40 of a comparative example 2 illustrated in FIGS. 5A to 5C. In the manufacturing device 40 illustrated in these FIGS. 5A to 5C, a magnet presser 45 is pressed onto the magnet body 30 so as to suppress movement of the magnet piece 31, and diffusion of the magnet piece 31 by release of stress at a moment of cleavage is prevented. That is, in the manufacturing device 40 in the comparative example 2, in addition to the manufacturing device 40 in the comparative example 1, the magnet presser 45 moving vertically with the blade 43 is provided.

In the state in which the notched groove 33 as the scheduled cleavage line is aligned so as to be located in the middle between the pair of dies 41 and 42 by the magnet conveying device, not shown, as the blade 43 lowers, first, the magnet presser 45 is brought into contact with the upper surface of the magnet body 30 and suppresses movement of the magnet body 30 (FIG. 5A). If the blade 43 further lowers, the blade 43 presses the back side of the notched groove 33 downward, and the magnet body 30 is cleaved along the notched groove 33 by the three-point bending of the blade 43 and the mutually adjacent edge portions 41a and 42a of the pair of dies 41 and 42 (FIG. 5B).

At this time, the coating film 35 on the upper surface side of the magnet body 30 is in contact with the blade 43 and is pressed downward and bent on the portion of the scheduled cleavage line. This bent amount is smaller than that in the comparative example 1 since the magnet presser 45 presses the magnet body 30 and the magnet piece 31 from the upper side. Thus, a tensile force for separating the coating film 35 on the upper surface side of the cleaved magnet piece 31 and the coating film 35 on the upper surface side of the magnet body 30 that has not been cleaved yet from each other becomes weaker, the coating film 35 is not rolled so as to be capable of being cut and is not cut off.

Then, with the subsequent rise of the blade 43, in the state in which the magnet body 30 and the magnet piece 31 are connected by the coating film 35 on the upper surface side that has not been cut, they return from the bent state by the magnet presser 45 (FIG. 5C).

Thus, in this embodiment, the cleaving process of the magnet body 30 is performed as follows.

FIGS. 6A to 6D are views illustrating the cleaving process of a manufacturing device 60 in this embodiment. The manufacturing device 60 in this embodiment includes a magnet presser 65 similar to the comparative example 2 for preventing diffusion of the magnet piece 31 by stress release at the moment of cleavage. However, the magnet presser 65 of this embodiment is constituted such that its pressing surface 65a is located at a position retreated only by a predetermined distance X from a tip end of the blade 63. The magnet presser 65 is constituted so as to have elasticity by bending a thin-plate metal in a shape of a loop as illustrated. Thus, even if the cleaved magnet body 30 and the magnet piece 31 are in contact with the magnet presser 65, they are not chipped. This magnet presser 65 is not limited to an elastic body using the aforementioned loop-shaped thin-plate metal but may be formed of other elastic bodies such as rubber (including foamed resin) and the like.

Figure 6A:
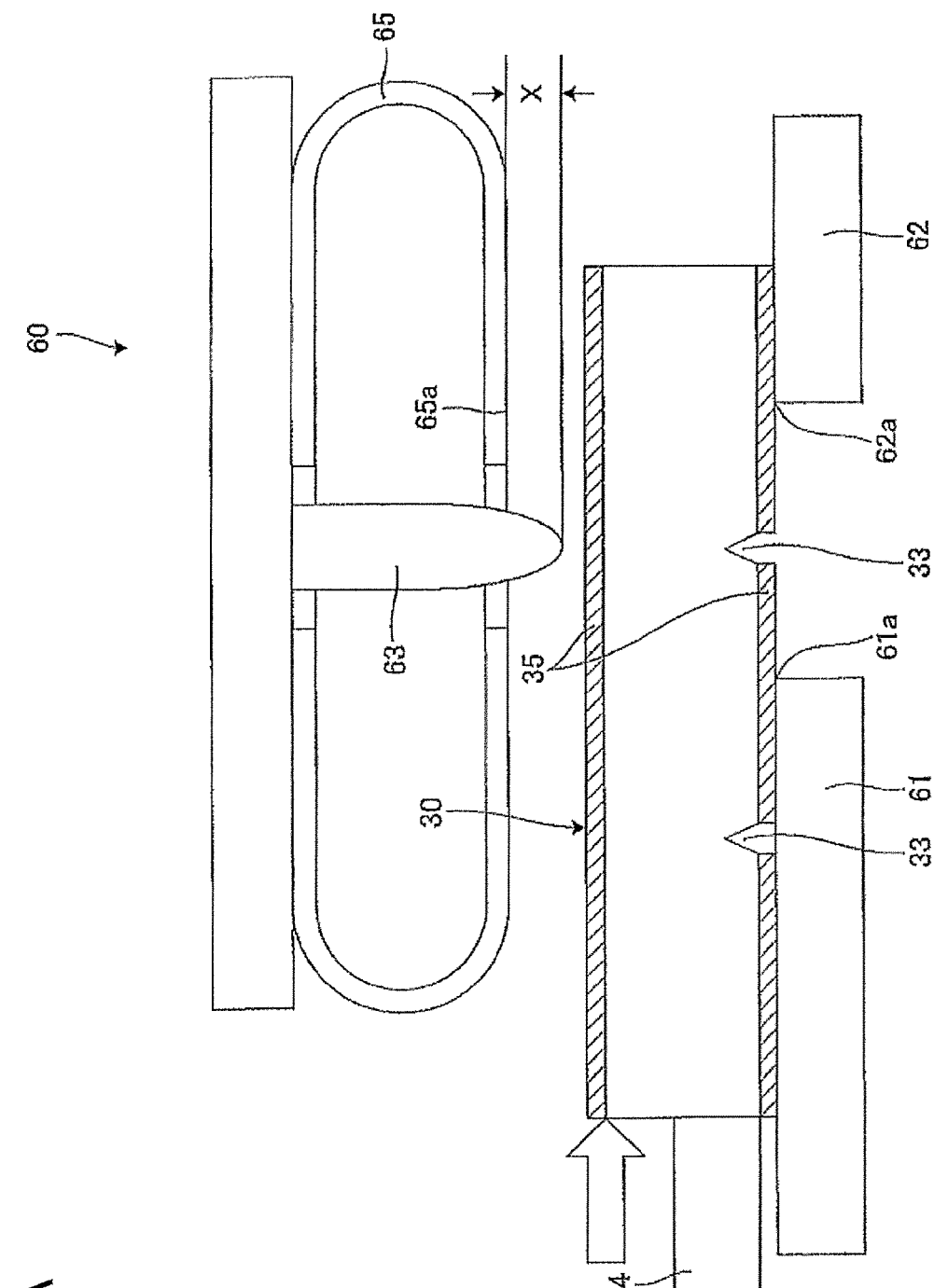
FIG. 6A is a view illustrating the cleaving process of a manufacturing device in a first embodiment.

In this embodiment, first, feeding-direction position of the magnet body 30 placed on the pair of dies 61 and 62 is adjusted by a feeding amount of the magnet body 30 so that the notched groove 33 is located immediately below a contact portion 73 of the blade 63 (FIG. 6A). Conveyance of the magnet body 30 is performed by pushing out the magnet body 30 in the conveying direction by a magnet conveying device 64. The magnet conveying device 64 is constituted by an LM guide or the like combining an AC servo motor and a ball screw, for example, and is capable of feeding the magnet body 30 only by a predetermined amount in the feeding direction and stopping it at an arbitrary position.

In the state in which the magnet body 30 is positioned as above, the blade 63 is lowered. Then, the tip end of the blade 63 is brought into contact with the upper surface of the magnet body 30. Even in this state, the pressing surface 65a of the magnet presser 65 is located above, separated from the upper surface of the magnet body 30.

Figure 6B:
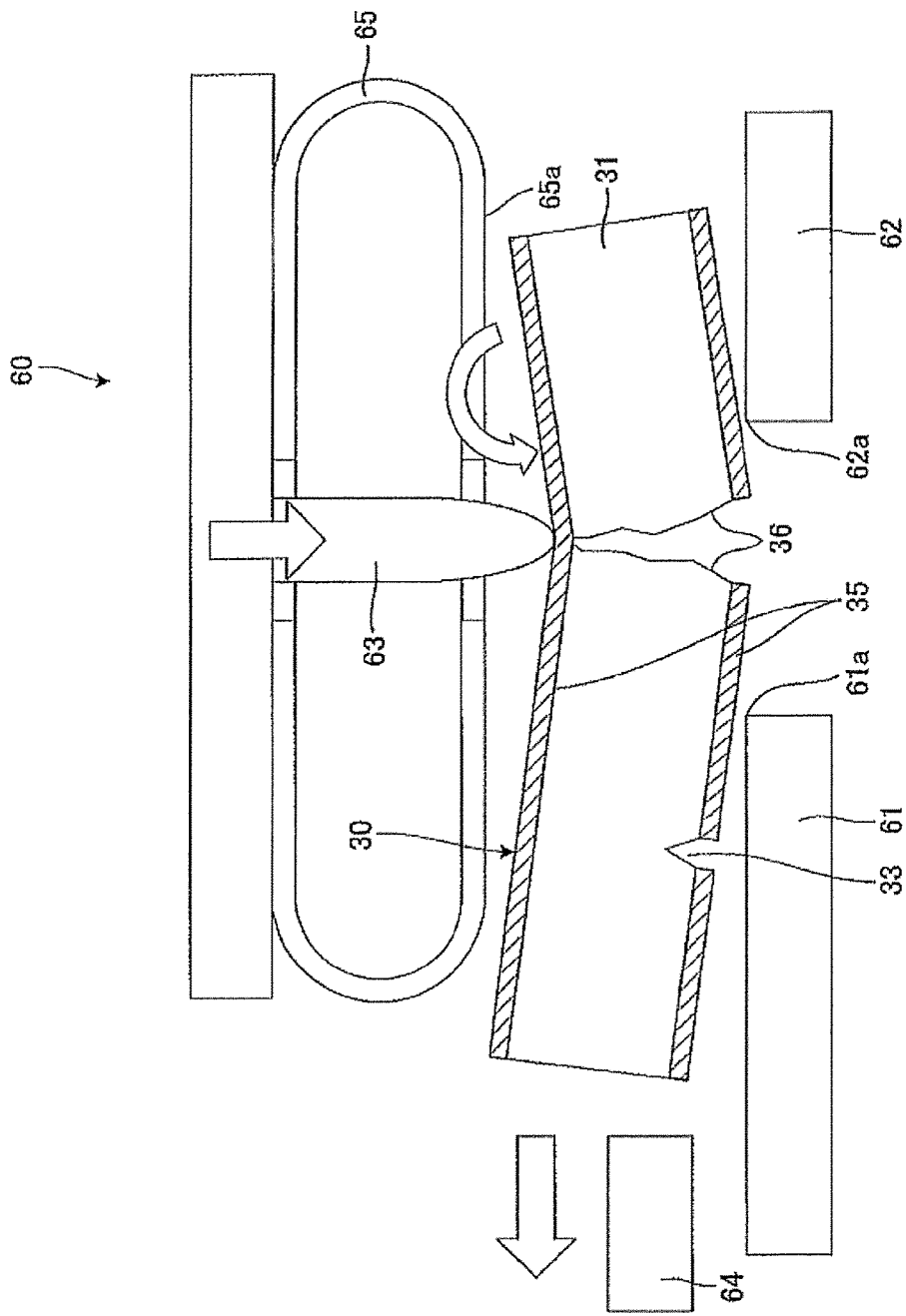
FIG. 6B is a view illustrating the cleaving process of the manufacturing device in the first embodiment.

When the blade 63 is further lowered, the blade 63 presses a back-surface portion of the notched groove 33 of the magnet body 30 downward, and the magnet body 30 is cleaved along the notched groove 33 by the three-point bending of the blade 63 and the mutually adjacent edge portions 61a and 62a of the pair of dies 61 and 62 (FIG. 6B). A start position of a crack generated in cleaving becomes the notched groove 33 which is a fragile portion. A lowering speed of the blade 63 is preferably 30 [mm/sec] or more, for example. Then, the blade 63 moves to a lowering end.

In this cleavage of the magnetic body 30, the magnet presser 65 is lowered/moved with the blade 63, and even at the time when the blade 63 has been moved to a lowering end, the pressing surface 65a of the magnet presser 65 holds a distance from the upper surface of the magnet body 30 so as not to be in touch. Regarding the distance between the pressing surface 65a of the magnet presser 65 and the upper surface of the magnet body 30 at this lowering end, the predetermined distance X from the tip end of the blade 63 described above is set so as to be approximately 2 [mm], for example. The distance between the pressing surface 65a of the magnet presser 65 at the lower end and the upper surface of the magnet body 30 is set to such a degree that the magnet presser 65 regulates rotational movement caused by the cleavage between the magnet body 30 and the magnet piece 31 by the middle portion thereof and moreover, each end portion of them can be pushed back downward. Then, by means of the regulation in the middle portion and the action of pushing back, cutting of the coating film 35 being applied is made possible. That is, unlike the form in FIG. 5B, the pressing surface 65a of the magnet presser 65 is not in touch with the magnet body 30 to be cleaved in an initial state (at start of the cleaving process), but with the rotational movement of the magnet body 30 and the magnet piece 31 after cleavage, they are brought into contact with each end portion of the magnet body 30 and the magnet piece 31 and pushes them back so as to aid cutting of the coating film 35.

In the following, a process to this cutting of the coating film 35 will be described in more detail. The magnet body 30 immediately after the cleavage rotationally moves so as to be tilted diagonally with an end portion on the cleavage surface 36 side (tip end side in the conveying direction)

directed downward using the edge portion 61a of the die 61 as a fulcrum in a state in contact with the lowered blade 63. Moreover, the magnet piece 31 cleaved at the tip end of the magnet body 30 rotationally moves so as to be tilted diagonally with the end portion on the cleavage surface 36 side (rear end side in the conveying direction) directed downward using the edge portion 62a of the die 62 as a fulcrum. At this point of time, though the coating film 35 between the magnet body 30 and the magnet piece 31 is cut by the cleavage surface 36 generated by the notched groove 33 on lower surface sides and side surface sides of the magnet body 30 and the magnet piece 31 but has not been cut yet on the upper surface sides of the magnet body 30 and the magnet piece 31.

By means of this rotational movement, the magnet body 30 moves an end portion (rear end in the conveying direction) on a side opposite to the cleavage surface 36 upward using the edge portion 61a of the die 61 as a fulcrum and the cleaved magnet piece 31 moves an end portion (front in the conveying direction) on the side opposite to the cleavage surface 36 upward using the edge portion 62a of the die 62 as a fulcrum. The movement of each of these end portions is regulated by contact of each of these end portions with the pressing surface 65a of the magnet presser 65 located above each of the end portions and lowering together with the blade 63 in a stage before the blade 63 and the magnet presser 65 reach or almost reach the lowermost stage. Regarding the magnet body 30 and the magnet piece 31, end portions on the side opposite to the cleavage surface 36 is pressed downward by the magnet presser 65 or bounced back, respectively, and their attitudes are returned by the magnet presser 65 so as to be tilted along support surfaces of the dies 61 and 62, respectively. Since the magnet presser 65 is formed of an elastic body as described above, when the cleaved magnet body 30 and the magnet piece 31 are brought into contact with the magnet presser 65, the cleaved magnet body 30 and the magnet piece 31 are prevented from being chipped.

Figure 6C:
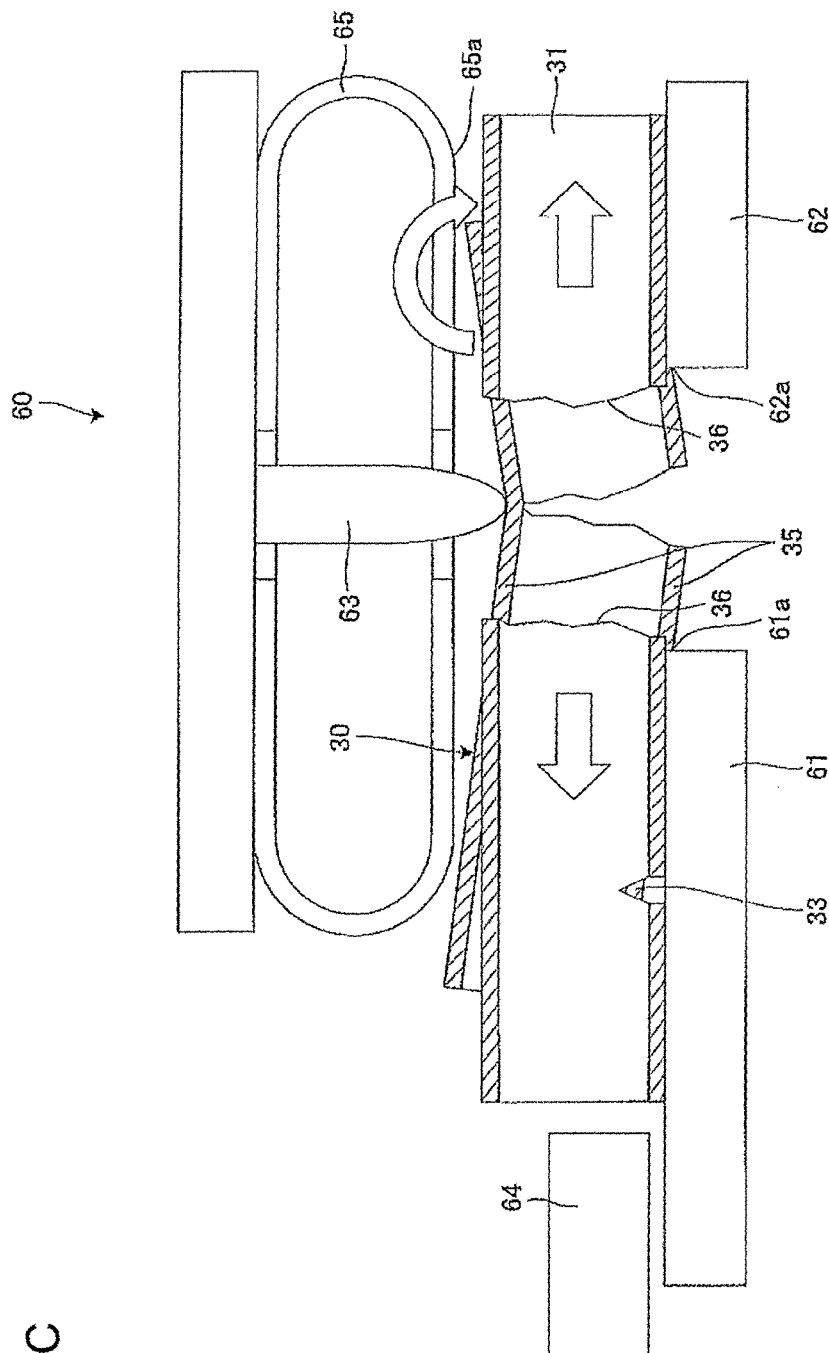
FIG. 6C is a view illustrating the cleaving process of the manufacturing device in the first embodiment.

This returning movement of the magnet body 30 and the magnet piece 31 acts so that an upper end of the end portion of the magnet piece 31 on the cleavage surface 36 side and an upper end of the end portion of the magnet body 30 on the cleavage surface 36 side are separated from each other and separates the cleavage surface 36 of the magnet body 30 and the cleavage surface 36 of the magnet piece 31 from each other (FIG. 6C). By means of this separating movement, the coating film 35 on the upper surface sides of the magnet body 30 and the magnet piece 31 is stretched in the separated portion and the coating film 35 on the upper surface side connecting the magnet body 30 and the magnet piece 31 is cut off.

Figure 6D:
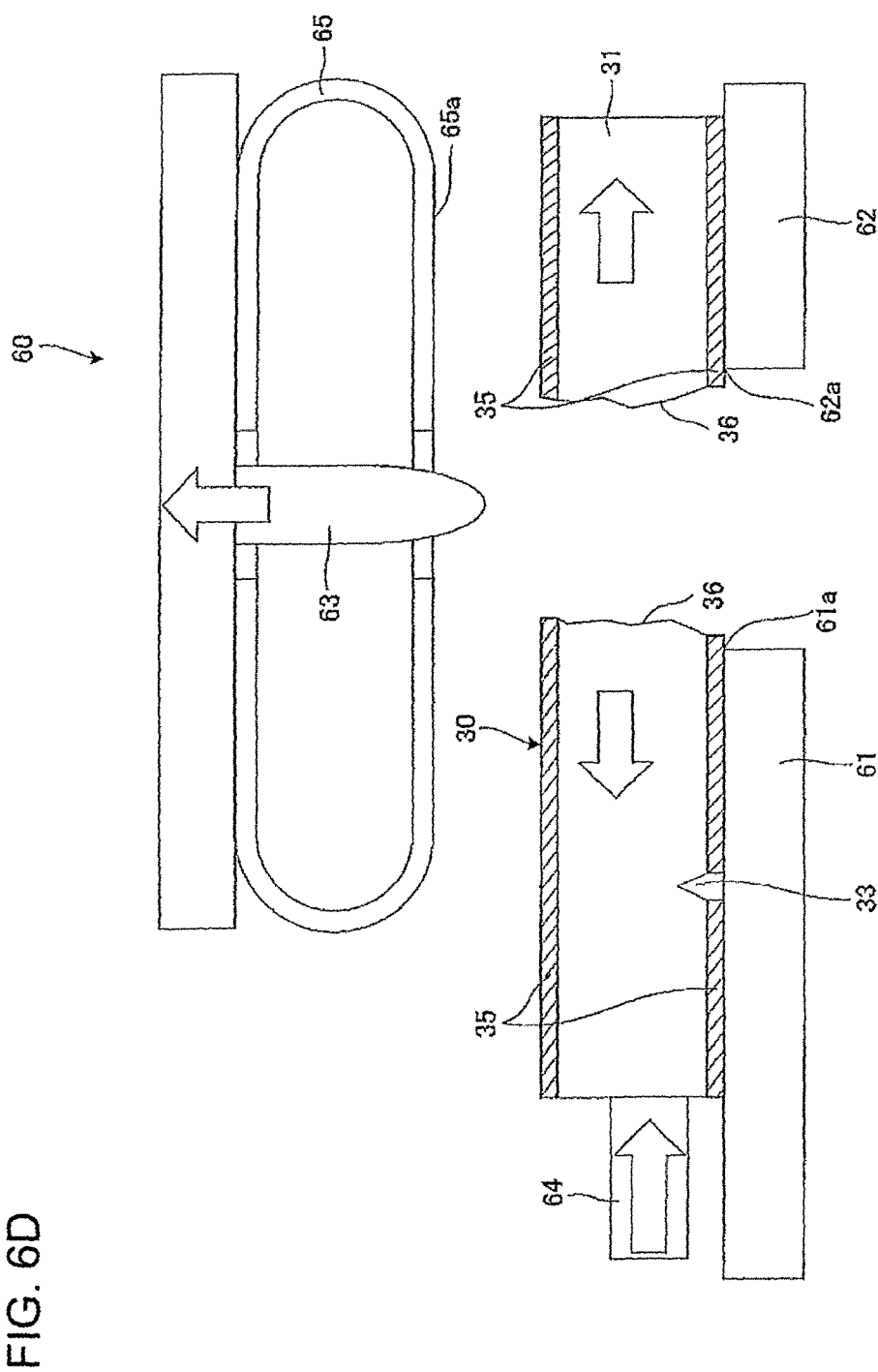
FIG. 6D is a view illustrating the cleaving process of the manufacturing device in the first embodiment.

Then, the magnet body 30 and the magnet piece 31 can be brought into a completely separated state including the coating film 35. Then, the blade 63 is raised (FIG. 6D). Subsequently, in order to cleave the subsequent magnet piece 31, the magnet body 30 is fed by the magnet conveying device 64 only for one piece of the magnet piece 31 in the feeding direction, it is cleaved by the similar procedure including the magnet piece 31 and the coating film 35, and the aforementioned procedure is repeated for the required number of cleavages.

Figure 7:
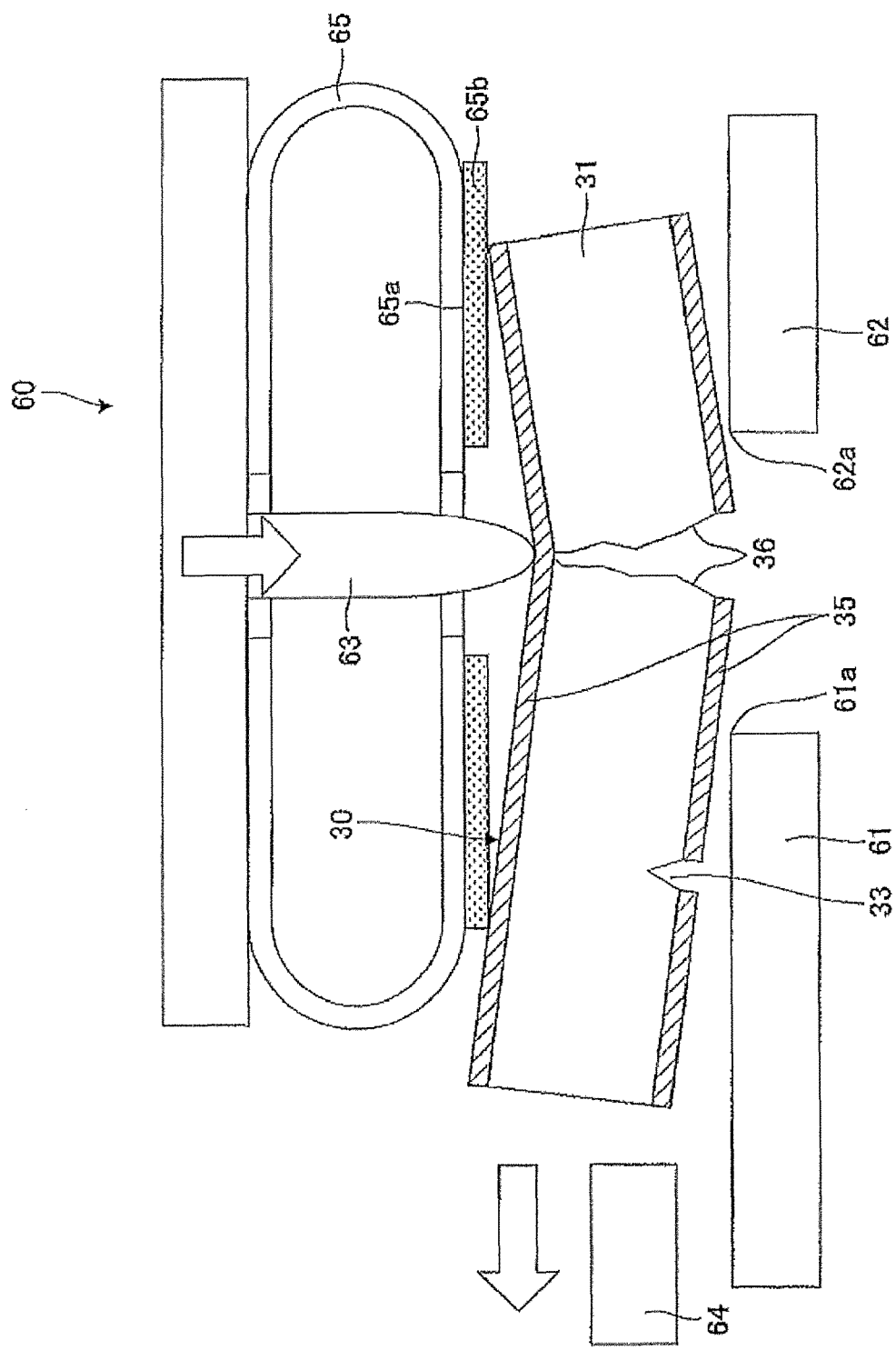
FIG. 7 is a schematic configuration diagram illustrating another embodiment of the manufacturing device in the first embodiment.

In the aforementioned embodiment, constitution having elasticity by bending thin-plate metal in a loop shape as the magnet presser 65 is described. However, even if the magnet presser 65 is brought into contact with the cleaved magnet body 30 and the magnet piece 31, another soft elastic body 65b may be provided on the pressing surface 65a of the magnet presser 65 as illustrated in FIG. 7 in order to further prevent them from being chipped.

Moreover, in the aforementioned embodiment, as the cleaving process, cleavage into the magnet body 30 after cleavage and the magnet piece 31 smaller than the magnet body 30 after cleavage by pressing the scheduled cleavage portion of the permanent magnet body 30 is described. However, as the permanent magnet body 30 is sequentially cleaved by a plurality of scheduled cleavage portions, a size of the magnet body 30 after cleavage becomes small and finally, the sizes of the magnet body 30 after cleavage and the magnet piece 31 become equal. Therefore, including the cleavage of the permanent magnet body 30 into halves by the scheduled cleavage portion, the magnet body 30 after cleavage and the magnet piece 31 having the equal size are also included in the present invention.

In this embodiment, effects described below can be exerted.

(A) A process of positioning the permanent magnet body 30 of which a surface is coated with the coating film 35 for deterioration prevention so that its scheduled cleavage portion is located between the two fulcrums (the edge portions 61a and 62a of the dies 61 and 62) supporting the permanent magnet body 30 and a cleavage process of cleaving the magnet body 30 after cleavage and the magnet piece 31 by pressing the scheduled cleavage portion of the permanent magnet body 30 are provided. Then, subsequently to the cleavage process, a coating-film cutting process of cutting the coating film 35 between the cleaved magnet body 30 and the magnet piece 31 by pressing the end portion of the magnet piece 31 cleaved in the cleaving process from a pressing side of the scheduled cleavage portion is provided. The end portion is on side opposite to the cleavage surface side. Particularly in this embodiment, in the positioning process, the pressing surface 65a of the magnet presser 65 is constituted with a distance from the upper surface of the magnet body 30 so as not to be in contact, and in the middle or after the end of the cleavage process, the end portion of the magnet piece 31 on the side opposite to the cleavage surface 36 side is pressed from the side pressing the scheduled cleavage portion for the first time.

Therefore, the magnet piece 31 rotates by moving the end portion on the side opposite to the cleavage surface 36 upward with the cleavage, but the end portion is pressed downward or bounced back by the contact with the lowered magnet presser 65 and the attitude thereof is returned by the magnet presser 65 so as to be tilted along the support surface of the die 62. As a result, it acts so that the upper end of the end portion of the magnet piece 31 on the cleavage surface 36 side and the upper end of the end portion of the magnet body 30 on the cleavage surface 36 side are separated from each other and separates the cleavage surface 36 of the magnet body 30 and the cleavage surface 36 of the magnet piece 31 from each other. By means of this separating movement, the coating film 35 on the upper surface sides of the magnet body 30 and the magnet piece 31 is stretched, and the coating film 35 on the upper surface side connecting the magnet body 30 and the magnet piece 31 can be cut off.

(B) The coating-film cutting process is performed by pressing the end portion of the magnet piece 31 on the side opposite to the cleavage surface 36 side by the magnet presser 65 formed of an elastic body. Thus, when the cleaved magnet body 30 and the magnet piece 31 are brought into contact with the magnet presser 65, the cleaved magnet body 30 and the magnet piece 31 are prevented from being chipped.

Second Embodiment

Figure 8A:
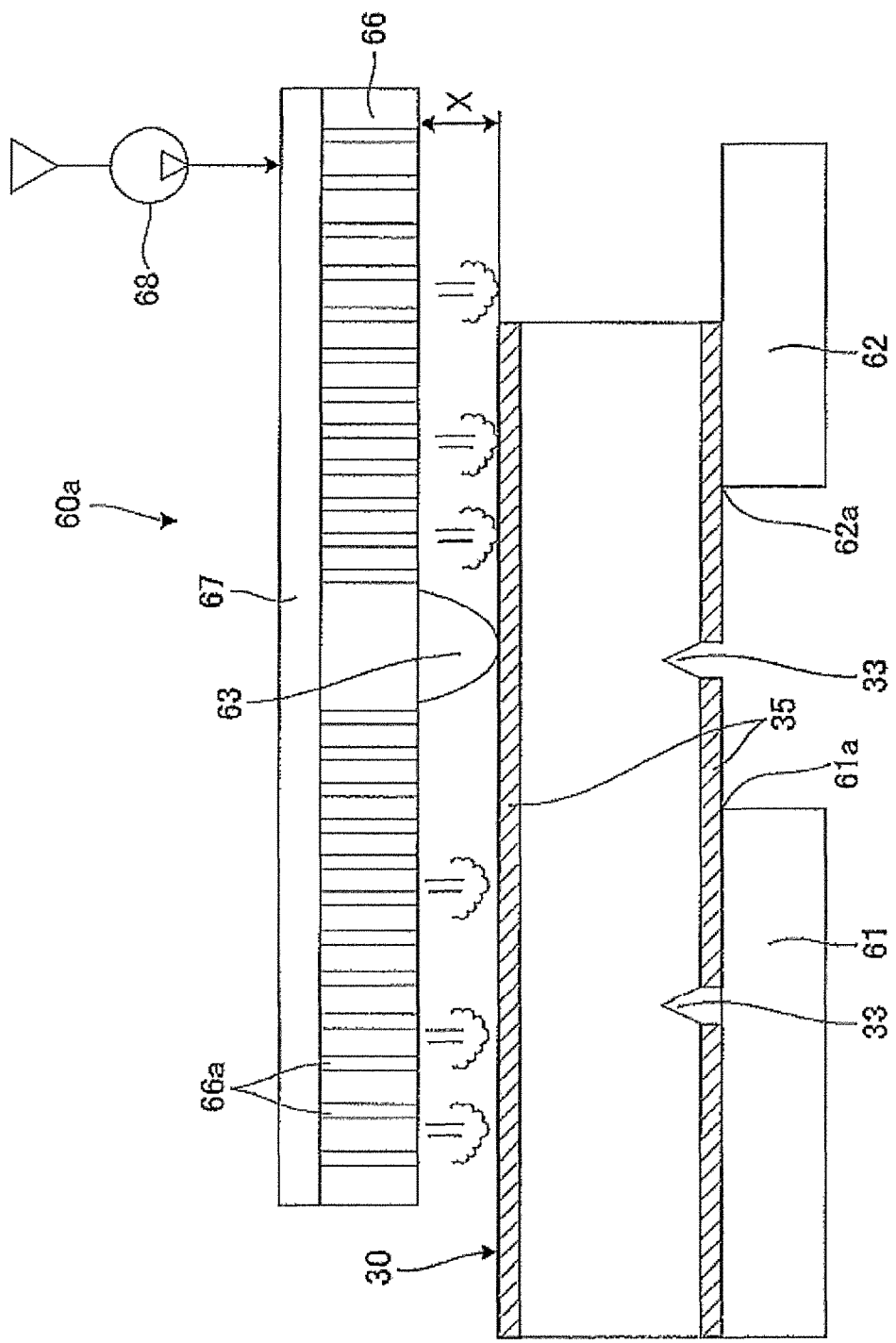
FIG. 8A is a view illustrating the cleaving process of a manufacturing device in a second embodiment.
Figure 8B:
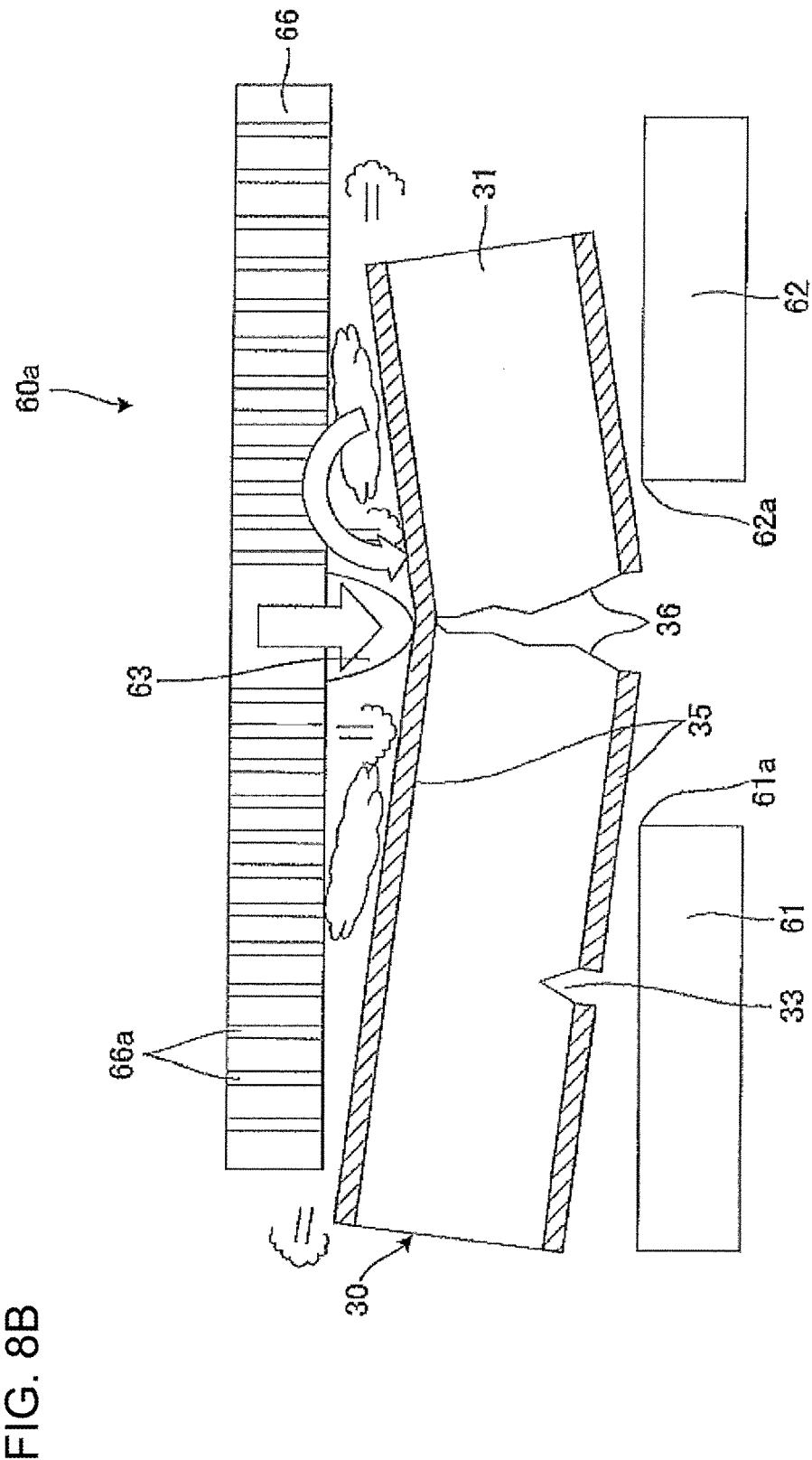
FIG. 8B is a view illustrating the cleaving process of the manufacturing device in the second embodiment.
Figure 8C:
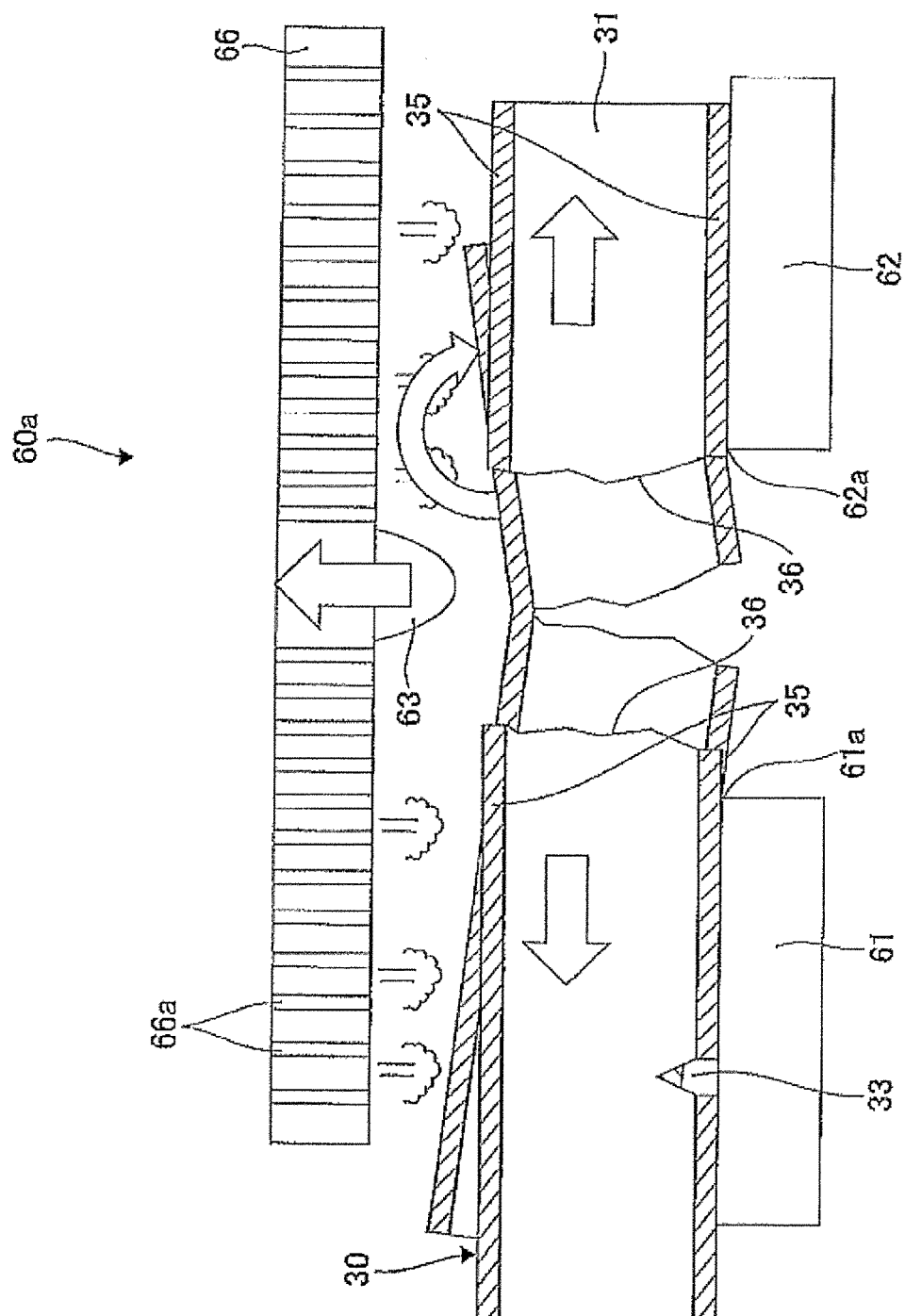
FIG. 8C is a view illustrating the cleaving process of the manufacturing device in the second embodiment.

FIGS. 8A to 8C are views illustrating a second embodiment of a manufacturing method and a manufacturing device for manufacturing a magnet piece constituting a magnet body for a field pole disposed on a rotating electric machine to which the present invention is applied, in which FIG. 8A is a schematic configuration diagram illustrating the manufacturing device for manufacturing the magnet piece and FIGS. 8B and 8C are explanatory views illustrating its operating state. In this embodiment, constitution in which the magnet presser for pressing the magnet body and the magnet piece is formed by means for ejecting gas (air) is added to the first embodiment. The same devices as those in the first embodiment are given the same reference numerals, and the explanation will be omitted or simplified.

In FIG. 8A, a manufacturing device 60a of this embodiment includes a nozzle plate 66 formed as the magnet presser 65 integrally with the blade 63 and blowing out air toward the magnet body 30 from both side regions of the blade 63. In this embodiment, too, the tip end of the blade 63 is constituted so as to be located below a lower surface of the nozzle plate 66 only by the predetermined distance X similarly to the first embodiment.

The magnet presser 65 of this embodiment includes the nozzle plate 66 and an air reservoir 67. The nozzle plate 66 has a large number of nozzle holes 66a formed in a direction perpendicular to the surface of the magnet body 30 and is integrated with the blade 63. The air reservoir 67 is provided on a rear surface of the nozzle plate 66 so that supplied air is distributed to nozzle holes 66a of the nozzle plate 66 and supplied. To the air reservoir 67, air is supplied from an air supply device 68, and the supplied air is distributed by the air reservoir 57 to each of the nozzle holes 66a of the nozzle plate 66 and injected toward the surface of the magnet body 30 through each of the nozzle holes 66a. The other constitutions are similarly to those of the first embodiment.

In this embodiment, the cleavage process of the magnet body 30 is performed as follows. That is, similarly to the first embodiment, the magnet body 30 is positioned on the manufacturing device 60a so that the notched groove 33 is located immediately below a contact portion 73 of the blade 63 by adjusting a feeding direction position of the magnet body 30 placed on the pair of dies 61 and 62. Subsequently, the blade 63 is lowered, and the tip end of the blade 63 is brought into contact with the upper surface of the magnet body 30 (FIG. 8A). In this state, too, the lower surface of the nozzle plate 66 which is the magnet presser 65 is located above from the upper surface of the magnet body 30, and the air is injected toward the magnet body 30 from the nozzle holes 66a.

Moreover, when the blade 63 is lowered, as illustrated in FIG. 8B, the blade 63 presses the rear surface portion of the notched groove 33 of the magnet body 30 downward, and the magnet body 30 is cleaved along the notched groove 33 by the three-point bending of the blade 63 and the mutually adjacent edge portions 61a and 62a of the pair of dies 61 and 62 (FIG. 8B). A start position of the crack 35 generated during cleavage becomes the notched groove 33 which is the fragile portion. The lowering speed of the blade 63 is preferably 30 [mm/sec] or more, for example. Then, the blade 63 moves to the lowering end.

In this cleavage of the magnet body 30, too, the nozzle plate 66 which is the magnet presser 65 is lowered and moved with the blade 63, and even at the point of time when the blade 63 has been moved to the lowering end, the lower surface of the nozzle plate 66 holds a distance from the upper surface of the magnet body 30 so as not to be in touch. The distance between the lower surface of the nozzle plate 66 and the upper surface of the magnet body 30 at this lowering end is set so as to be approximately 2 [mm], for example, similarly to the first embodiment. Then, the air injected from the nozzle hole 66a of the nozzle plate 66 flows toward the magnet body 30.

The cleaved magnet body 30 and the magnet piece 31 are both in the tilted state (FIG. 8B). That is, the magnet body 30 immediately after the cleavage rotationally moves so as to be tilted diagonally with the end portion on the cleavage surface 36 side (tip end side in the conveying direction) downward using the edge portion 61a of the die 61 as a fulcrum in the state in contact with the lowered blade 63. Moreover, the magnet piece 31 which has been cleaved at the tip end of the magnet body 30 rotationally moves so as to be tilted diagonally with the end portion on the cleavage surface 36 side (rear end side in the conveying direction) downward using the edge portion 62a of the die 62 as a fulcrum. At this point of time, the coating film 35 between the magnet body 30 and the magnet piece 31 on its tip end side is cut by the cleavage surface 36 generated by the notched groove 33 on the lower surface sides and the side surface sides of the magnet body 30 and the magnet piece 31 but is not cut on the upper surface side of the magnet body 30.

By means of this rotational movement, the magnet body 30 moves an end portion (rear end in the conveying direction) on the side opposite to the cleavage surface 36 side upward using the edge portion 61a of the die 61 as a fulcrum and the cleaved magnet piece 31 moves an end portion (front in the conveying direction) on the side opposite to the cleavage surface 36 side upward using the edge portion 62a of the die 62 as a fulcrum. The movement of each of these end portions is performed against the action of pushing back by the air jet injected from the nozzle plate 66 located above them and lowering with the blade 63. Thus, in a stage before the blade 63 and the nozzle plate 66 reach or almost reach the lowermost stage, the aforementioned movement is regulated. Then, each of the magnet body 30 and the magnet piece 31 is pressed downward or bounced back by the air jet from the nozzle plate 66 and their attitude is returned so as to be tilted along the support surfaces of the respective dies 61 and 62. Since the magnet presser 65 is formed by the nozzle plate 66 injecting the air, contact of the cleaved magnet body 30 and the magnet piece 31 with the nozzle plate 66 can be suppressed, and the cleaved magnet body 30 and the magnet piece 31 are prevented from being chipped.

This returning movement of the magnet body 30 and the magnet piece 31 acts so that the upper end of the end portion of the magnet piece 31 on the cleavage surface 36 side and the upper end of the end portion of the magnet body 30 on the cleavage surface 36 side are separated from each other and separates the cleavage surface 36 of the magnet body 30 and the cleavage surface 36 of the magnet piece 31 from each other (FIG. 8C). By means of this separating movement, the coating film 35 on the upper surface sides of the magnet body 30 and the magnet piece 31 is stretched in the separated portion and the coating film 35 on the upper surface side connecting the magnet body 30 and the magnet piece 31 is cut off at the separated portion.

In this embodiment, in addition to the effects (A) and (B) in the first embodiment, the effects described below can be exerted.

(C) The coating-film cutting process is performed by pressing the end portion on the side opposite to the cleavage surface 36 side of the magnet piece 31 by an air jet. The magnet piece 31 rotates by moving the end portion on the side opposite to the cleavage surface 36 side upward with the cleavage, but the end portion is pressed downward or bounced back by the air jet from the lowered nozzle plate 66 and the attitude thereof is returned so as to be tilted along the support surface of the die 62. That is, since the magnet presser 65 is formed by the nozzle plate 66 injecting the air, by means of the aforementioned action that contact of the cleaved magnet piece 31 with the nozzle plate 66 can be suppressed, and chipping of the cleaved magnet piece 31 can be prevented, the upper end of the end portion of the magnet piece 31 on the cleavage surface 36 side and the upper end of the end portion of the magnet body 30 on the cleavage surface 36 side are separated, the cleavage surface 36 of the magnet body 30 and the cleavage surface 36 of the magnet piece 31 are separated from each other, and the coating film 35 on the upper surface sides of the magnet body 30 and the magnet piece 31 is stretched in the separation portion. Thus, the coating film 35 on the upper surface side connecting the magnet body 30 and the magnet piece 31 can be cut off at the separated portion.

The embodiments of the present invention has been described, but the embodiments only illustrate a part of application examples of the present invention and are not intended to limit the technical scope of the present invention to the specific constitution of the embodiments.

The present application claims a priority of Japanese Patent Application No. 2013-211769 filed with the Japan Patent Office on Oct. 9, 2013, and all the contents of which are hereby incorporated by reference.

The invention claimed is:

1. A manufacture method of manufacturing a magnet piece comprising a magnet body for a field pole disposed on a rotating machine by cleaving a permanent magnet body, the method comprising:
    positioning the permanent magnet body of which a surface is coated with a coating film for deterioration prevention such that a scheduled cleavage portion of the permanent magnet body is located between two fulcrums supporting the permanent magnet body, the scheduled cleavage portion having a notched groove on a first surface of the permanent magnet body;
    cleaving the permanent magnet body into a cleaved magnet body and the magnet piece by pressing the scheduled cleavage portion of the permanent magnet body from a second surface opposite to the first surface of the permanent magnet body;
    cutting the coating film, which has not been cut by the cleaving step, between the cleaved magnet body and the magnet piece by pressing an end portion of the magnet piece from the second surface of the permanent magnet body, the end portion being on a side opposite to a cleavage surface side of the magnet piece.

2. The manufacture method according to claim 1, wherein cutting the coating film comprises pressing the end portion of the magnet piece from the second surface of the permanent magnet body via an elastic body.

3. The manufacture method according to claim 1, wherein cutting the coating film comprises pressing the end portion of the magnet piece from the second surface of the permanent magnet body via an air jet.

4. A manufacturing device for manufacturing a magnet piece comprising a magnet body for a field pole disposed on a rotating electric machine by cleaving a permanent magnet body, the manufacturing device comprising:
    a support portion comprising two fulcrums configured to support the permanent magnet body on both sides of a scheduled cleavage portion of the permanent magnet body, a surface of the permanent magnet body being coated with a coating film for deterioration prevention and the scheduled cleavage portion having a notched groove on a first surface of the permanent magnet body;
    a cleaving unit configured to cleave the permanent magnet body into a cleaved magnet body and the magnet piece by pressing the scheduled cleavage portion of the permanent magnet body between the both fulcrums from a second surface opposite to the first surface of the permanent magnet body; and
    a coating film cutting unit configured to cut the coating film, which has not been cut by the cleaving unit, between the cleaved magnet body and the magnet piece by pressing an end portion of the magnet piece from the second surface of the permanent magnet body, the end portion being on a side opposite to a cleavage surface side of the magnet piece.

5. The manufacturing device according to claim 4, wherein
    the coating film cutting unit comprises an elastic body configured to cut the coating film by pressing the end portion of the magnet piece from the second surface of the permanent magnet body.

6. The manufacturing device according to claim 4, wherein
    the coating film cutting unit comprises an air jet configured to cut the coating film by pressing the end portion of the magnet piece from the second surface of the permanent magnet body.

7. The manufacturing device according to claim 4, wherein
    the manufacturing device comprises a magnet presser and a blade, the magnet presser having a pressing surface that faces the second surface of the permanent magnet body, and
    a tip end of the blade extends past the pressing surface by a predetermined distance such that when the cleaving unit cleaves the permanent magnet body into the cleaved magnet body and the magnet piece by pressing the scheduled cleavage portion of the permanent magnet body between the both fulcrums, the pressing surface does not contact the second surface of the permanent magnet body.

* * * * *